United States Patent [19]
Saib

[11] Patent Number: 6,097,878
[45] Date of Patent: Aug. 1, 2000

[54] AUTOMATIC TIMER EVENT ENTRY

[75] Inventor: Joseph Saib, San Diego, Calif.

[73] Assignees: Sony Corporation, Tokyo, Japan; Sony Electronics, Inc., Park Ridge, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/804,655

[22] Filed: Feb. 25, 1997

[51] Int. Cl.[7] .............................. H04N 5/761; H04N 5/76
[52] U.S. Cl. ................................. 386/83; 386/46
[58] Field of Search .................. 386/83, 46, 92, 386/1, 52, 95, 4; 360/32; H04N 5/761, 5/76

[56] References Cited

U.S. PATENT DOCUMENTS

| | | | |
|---|---|---|---|
| 4,977,455 | 12/1990 | Young | 386/83 |
| 5,260,788 | 11/1993 | Takano et al. | 386/83 |
| 5,541,738 | 7/1996 | Mankovitz | 386/83 |

FOREIGN PATENT DOCUMENTS

| | | |
|---|---|---|
| 0493099 | 7/1992 | European Pat. Off. . |
| 0639030 | 2/1995 | European Pat. Off. . |
| WO 9000847 | 1/1990 | WIPO . |
| WO 9413096 | 6/1994 | WIPO . |
| WO 9429811 | 12/1994 | WIPO . |

OTHER PUBLICATIONS

WO 90 00847 A (Insight Telecast Inc) Jan. 25, 1990, whole document.
Brugliera V: "Digital On–Screen Display A New Technology for the Consumer Interface", Cable TV Sessions, Montreux, Jun. 10–15, 1993, whole document.
EP 0 639 030 A (Tokyo Shibaura Electric Co; Toshiba Ave KK (JP)) Feb. 15, 1995, col. 25, line 26–col. 45, line 4.
WO 94 13096 A (Scientific Atlanta) Jun. 9, 1994, whole document.
WO 94 29811 A (Scientific Atlanta) Dec. 22, 1994, col. 5, line 32–col. 39, line 25.
EP 0 493 099 A (GTE Laboratories Inc) Jul 1, 1992, whole document.

*Primary Examiner*—Robert Chevalier
*Attorney, Agent, or Firm*—Blakely, Sokoloff, Taylor & Zafman LLP

[57] ABSTRACT

A system and method for automatically loading, with minimal input by a user, programming data of a show to be recorded by a home entertainment system. Upon receipt of a first command, the home entertainment system produces an electronic guide screen for display. The electronic guide screen displays (i) a first plurality of shows currently being broadcast, and (ii) a second plurality of shows to be broadcast at a future time. Thereafter, upon receipt of a second command when one of the second plurality of shows has been selected, a screen menu is generated. If an option grid of the screen menu is selected to record a future-broadcast show, programming data associated with that show is automatically loaded into a memory configured to contain shows scheduled to be recorded.

20 Claims, 5 Drawing Sheets

AUTOMATIC TIMER EVENT ENTRY

BACKGROUND OF THE INVENTION

1. Field of the Invention

The present invention relates to the field of information systems. More particularly, the present invention relates to a system and method for automatically loading programming data of a show to be recorded without manually inputting similar data through a timer screen.

2. Description of Art Related to the Invention

Over the last few years, there has been a growing demand for home entertainment systems working in conjunction with various types of broadcasting systems. One type of home entertainment system includes a broadcast satellite system including a digital satellite system (DSS). Normally, DSS comprises an antenna, an integrated receiver decoder (IRD) and a television receiver (TV). Also, the DSS may include an analog video cassette recorder (VCR) to receive analog data for recording purposes. The operations of the IRD are controlled by a remote control.

The antenna receives and routes digital bit streams to the IRD. A digital bit stream includes video, audio and programming data for each broadcast channel capable of being received by DSS. Programming data associated with a show (e.g., a television program, pay-per-view movie, etc.) includes its show title, start-time, end-time, broadcast channel number, and date of broadcast. The programming data is periodically updated and stored within the IRD and the prior programming data is deleted. The IRD further stores data for timed recordings. This data consists of a start-time, end-time, channel and date of a desired show to be recorded. IRD periodically accesses the data to determine whether it should tune to a channel and process the digital bit stream into analog signals recognized by the analog VCR.

Upon receiving a first command from the remote control, the IRD generates an "electronic guide screen" featuring programming data for each broadcast channel capable of being received by DSS. Thereafter, the electronic guide screen is displayed on the TV as shown in a preferred embodiment in FIG. 1.

Figure 1:
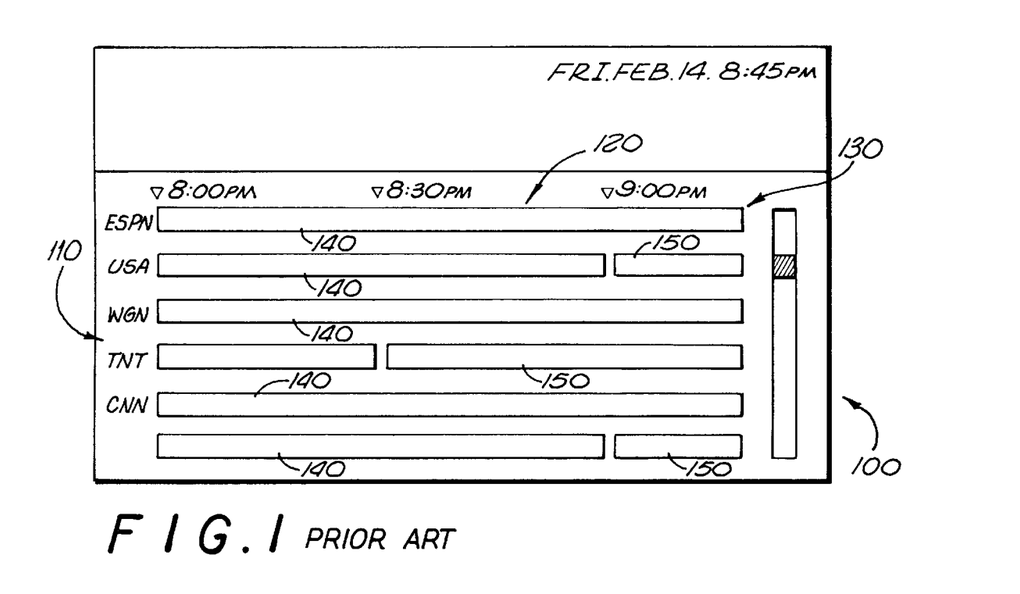
FIG. 1 is a front view of a conventional electronic guide screen displayed on a television receiver illustrating shows that currently being broadcast and scheduled to be broadcast in the future.

Similar to the format of a television guide publication, the electronic guide screen 100 features a vertical border 110 and a horizontal border 120 displaying time intervals usually in one-half hour increments. The vertical border 110 may include information content (e.g., all available channels sorted in numerical order by its broadcast channel number) or no information content. Each show is assigned to a horizontal show grid 130. The vertical positioning of each show grid 130 is based on its broadcast channel number (as shown), or the spelling its show title if alphabetical ordering is preferred. The length and horizontal positioning of each show grid 130 is based on its start-time and end-time. Thus, the duration of the particular show is ascertained by locating its assigned show grid and calculating its duration using the time intervals in the horizontal border 120. The electronic guide screen 100 may be arranged to display current-broadcast shows 140 as well as shows 150 to be broadcast in the future (referred to as "future-broadcast shows").

Figure 2:
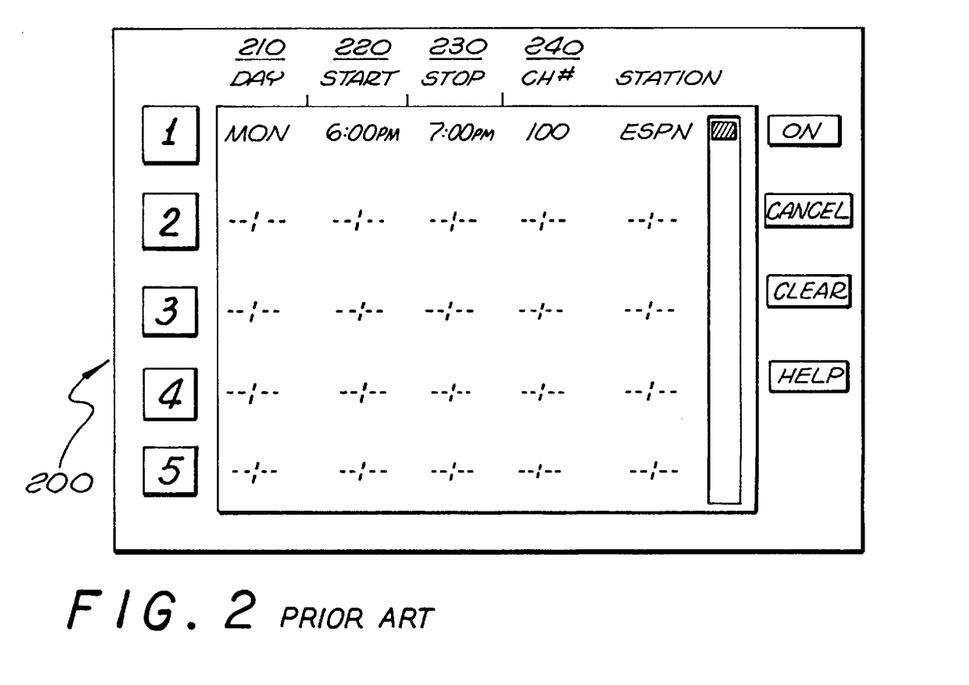
FIG. 2 is a front view of a conventional set timer screen displayed on a television receiver.

In order to load the data for timed recordings into the IRD, the user needs to exit the electronic guide screen and depress one or more buttons on the remote control until a set timer screen is displayed on the TV. As shown in FIG. 2, the set timer screen 200 requires certain data to be entered in order to automatically prepare the IRD to tune to a show for recording by an analog VCR; namely, a recording interval (one-time record, daily, or weekly) 210 corresponding to the day in which the desired show is broadcast, start-time 220, end-time 230 and broadcast channel number 240. This data must be loaded by the user manually depressing buttons. Noticeably, this data is identical to some programming data associated with the desired show.

Recently, it has been realized that this programming scheme is disadvantageous because it requires substantial interaction by the user after viewing the electronic guide screen; namely, selecting the set timer screen and manually inputting data. This programming scheme is grossly antiquated and it unnecessarily increases the possibility that the user will mistakenly enter data which differs from the programming data. This may cause the user to record the wrong show or only record a portion of the desired show. Hence, it would be advantageous to develop a mechanism to mitigate the possibility of user input error.

SUMMARY OF THE INVENTION

The present invention relates to a system and method for automatically loading, with minimal input by a user, programming data of a show to be recorded by a home entertainment system. In one embodiment, the method includes a plurality of operational steps. First, the programming data associated with the show must be received. Next, the programming data is stored within a first memory element, normally volatile memory. After storing the programming data, upon receipt of a first command, the home entertainment system produces an electronic guide screen for display. The electronic guide screen displays (i) a first plurality of shows currently being broadcast and (ii) a second plurality of shows to be broadcast at a future time. Thereafter, upon receipt of a second command when one of the second plurality of shows has been selected, a screen menu is generated. Lastly, if an option grid of the screen menu is selected, the programming data is automatically loaded into a second memory element that is configured to contain shows scheduled to be recorded.

BRIEF DESCRIPTION OF THE DRAWINGS

The features and advantages of the present invention will become apparent from the following detailed description in combination with the figures listed below.

DESCRIPTION OF THE PREFERRED EMBODIMENT

In its preferred embodiment, the present invention relates to a system and method for automatically loading programming data associated with a desired show to be recorded while only requiring minimal input by the user. Manual input of the programming data is not required. Herein, various terms are used to describe certain elements or characteristics of the present invention. For example, a "communication line" is broadly defined as any communication path between a source and a destination. The communication line may include one or more information-carrying lines (electrical wire, fiber optics, cable, etc.) or wireless communications through established techniques such as infrared (IR) and radio frequency (RF) signaling. A "signal" is defined as one or more signals transmitted in a parallel or serial manner.

Moreover, certain illustrative embodiments are described in order to convey the spirit and scope of the present invention. While these embodiments are set forth to describe the invention, such embodiments should not be construed as a limitation on the scope of the present invention.

Figure 3:
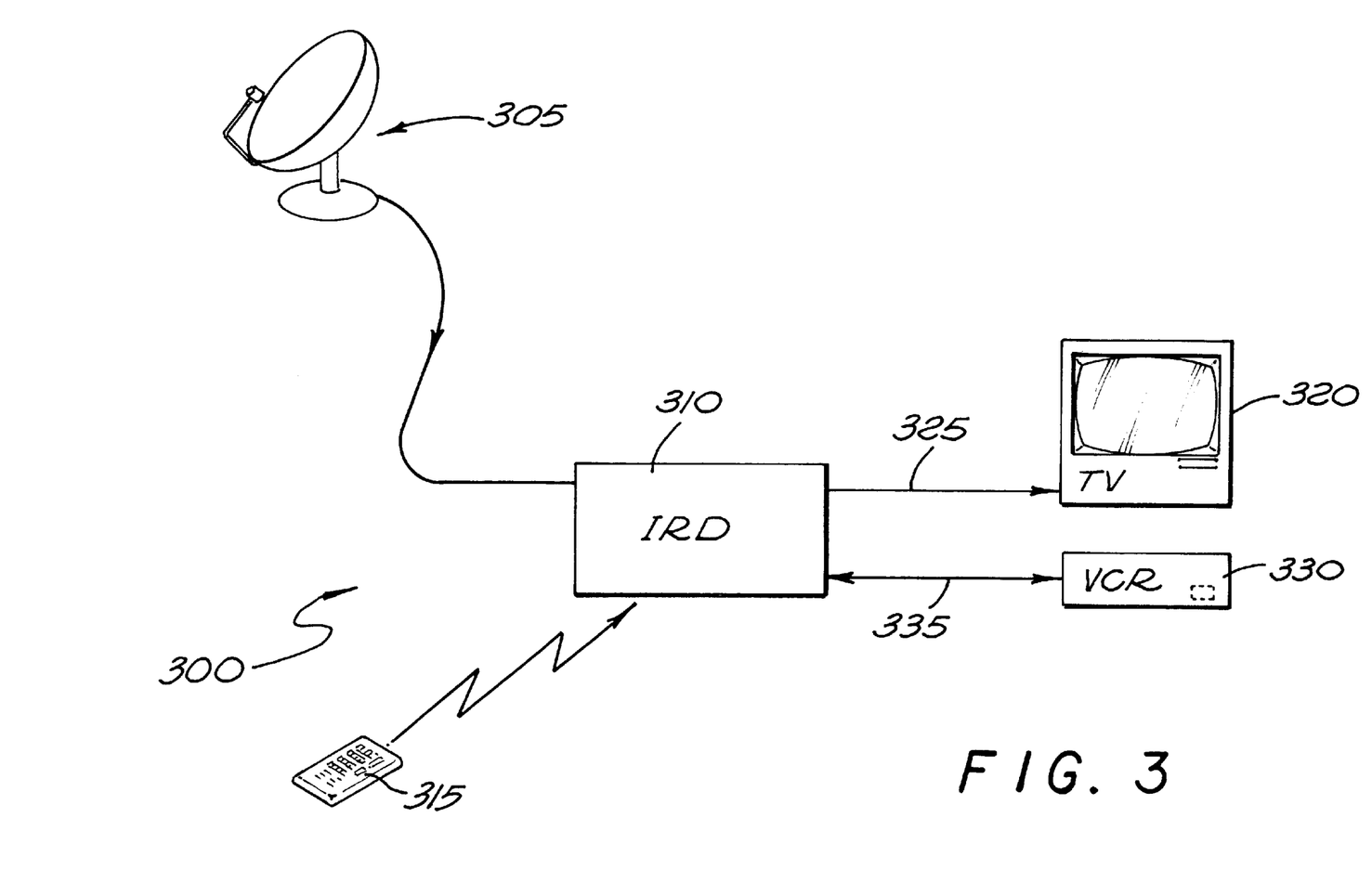
FIG. 3 is an illustrative block diagram of a home entertainment system utilizing the present invention.

Referring to FIG. 3, one embodiment of a home entertainment system utilizing the present invention is shown. The home entertainment system 300 comprises an antenna 305, an integrated receiver decoder (IRD) 310, and at least one analog-input peripheral device (e.g., a display monitor or television receiver "TV"320 and/or an analog recording device 330 such as a video cassette recorder "VCR"). Of course, other embodiments of the home entertainment system may be configured to utilize the present invention including the implementation of other types of receiver devices besides the IRD, such as a cable box for a Cable Broadcasting System, an Internet terminal, a digital satellite system (DSS) computer and the like.

The antenna 305 receives a digital bit stream from an orbiting satellite.

The bit stream is formatted in accordance with any video compression function and usually encrypted under either a symmetric key cryptographic function or an asymmetric key cryptographic function. Typically, the bit stream includes sensory data (e.g., video and/or audio, or communication data), and control information including programming data (e.g., show title, date of broadcast, broadcast channel number, show start-time, show end-time, etc.), although video is not provided if the bit stream involves audio-only programming.

The antenna 305 routes the bit stream to the IRD 310. The IRD 310 is responsible for decoding the bit stream and processing the decoded bit stream to produce one or more output signals having appropriate formats. As shown, an output signal is placed in an analog format and sent via communication line 325 to TV 320 for viewing, and/or via communication line 335 to analog recording device 330 for recording. The analog format may be in accordance with a video format established by National Television Systems Committee (NTSC), or perhaps other video formats, including but is not limited to Phase Alternating Line (PAL), Sequential Couleur avec Memoire (SECAM) and other recognized formats.

Figure 6:
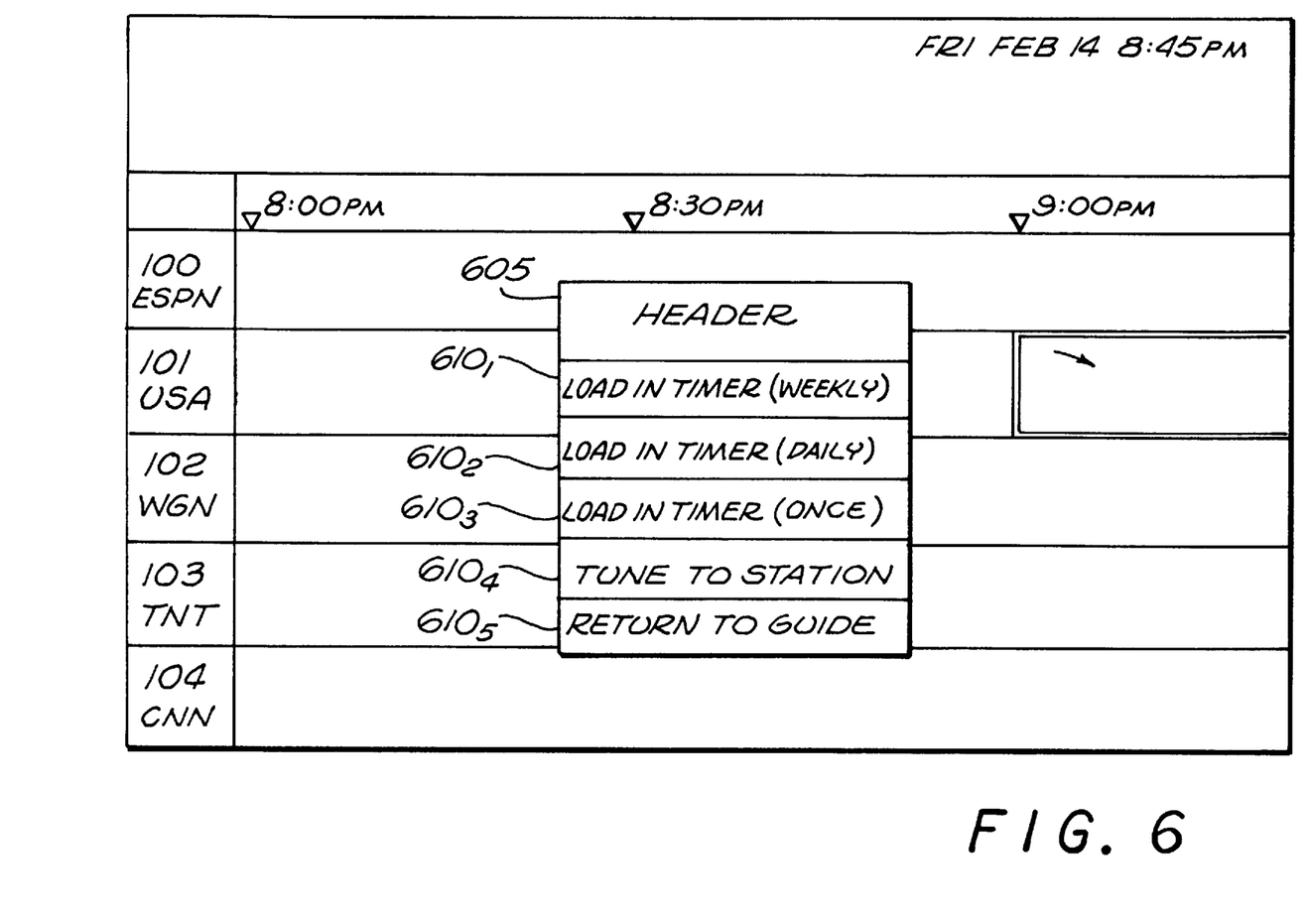
FIG. 6 is a front view of the electronic guide screen having a screen menu displayed upon selecting a grid of a show scheduled to be broadcast in the future.

Additionally, IRD 310 is responsible for responding to a plurality of commands from a remote control 315. For example, a first command causes the IRD to produce an output signal displaying at least an electronic guide screen on TV 320. A second command causes one of two conditions to occur. The condition depends on whether, upon initiating the second command, a cursor controlled by the remote control is positioned (i) over a grid of a show currently being broadcast ("current-broadcast show") or (ii) over a grid of a show scheduled to be broadcast in the future ("future-broadcast show"). If the cursor is positioned over the grid of a current-broadcast show, the second command will cause the IRD to tune to the broadcast channel of that show. If the cursor is positioned over the grid of a future-broadcast show, the IRD will cause a screen menu to be displayed in combination with the electronic guide screen. The screen menu includes a number of option grids as shown in FIG. 6. Upon scrolling the cursor to be position above a selected option and initiating a third command from the remote control 315, programming data associated with the show is automatically loaded for timed recording.

Figure 4:
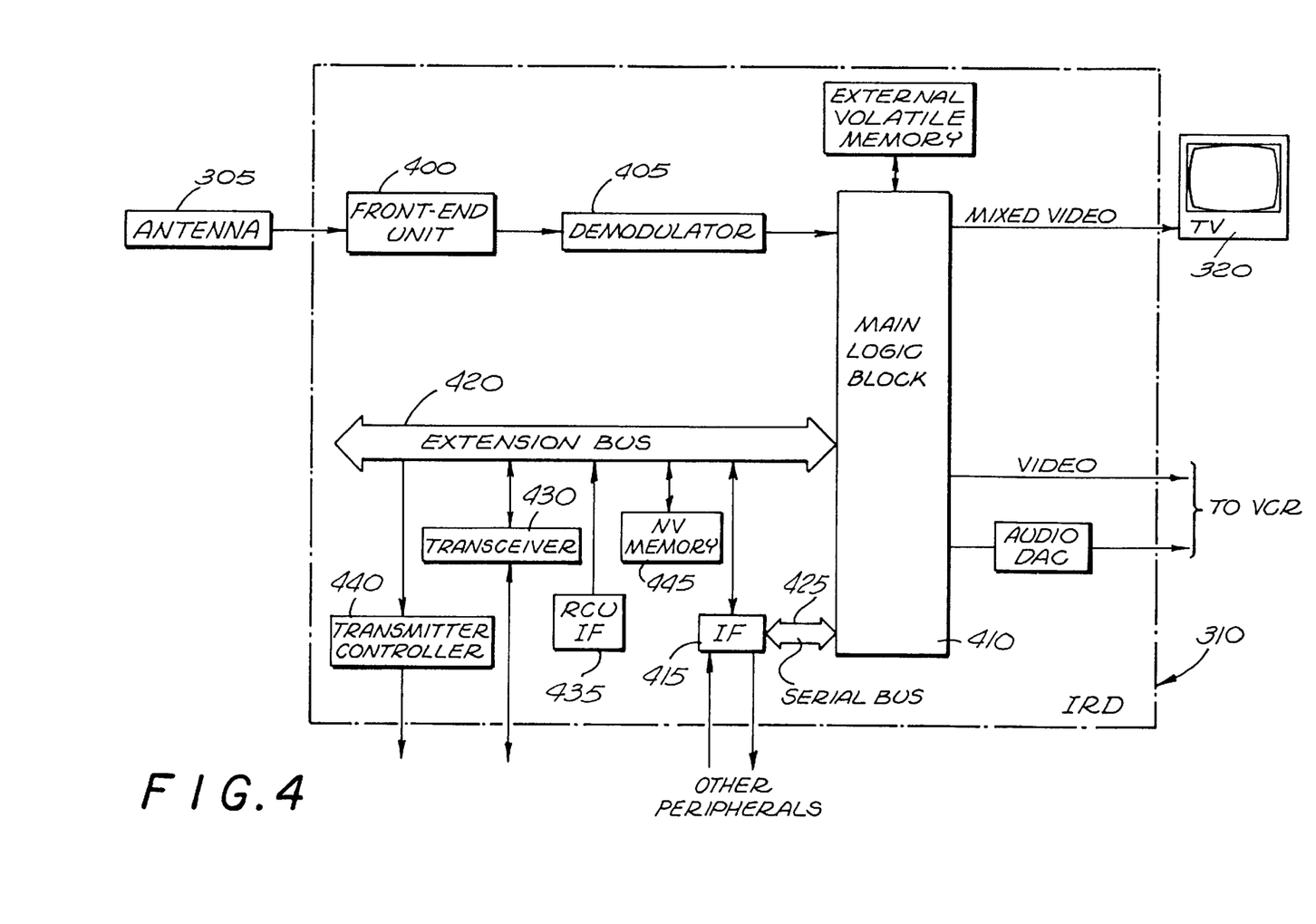
FIG. 4 is a detailed block diagram of one embodiment of an integrated receiver decoder implemented within the home entertainment system of FIG. 3.

Referring now to FIG. 4, one embodiment of an integrated receiver decoder (IRD) 310 is shown. The antenna 305 transfers the bit stream to a front-end unit 400 of the IRD 210. Although not shown, the front-end unit 400 includes (i) amplification circuitry used to amplify any relatively weak signals received at antenna 305 and (ii) a tuner which allows a user to receive a desired broadcast channel.

For the case where the user wishes to view show programming provided by the digital satellite system service provider, the bit stream associated with the desired broadcast channel is routed from front-end unit 400 to a demodulator 405. In demodulator 405, the bit stream is initially processed before transferring to a main logic block 410 for further processing. Such initial processing may include exposing the bit stream to QPSK-demodulation, viterbi-decoding, de-interleaving and Reed-Solomon decoding.

In some cases, however, IRD 310 is connected to other peripheral devices though an interface (IF) 415. In this embodiment, IF 415 includes a link layer integrated circuit (IC) and a physical layer IC (not shown) and complies with the IEEE standards document 1394 entitled "Standard for High Performance Serial Bus" (hereinafter referred to as "IEEE 1394"). This enables IRD 310 to connect digital-input peripheral devices such as digital VCRs, digital video disk players, digital laser disk players and the like. These digital-input peripheral devices supply control signals (e.g., IEEE 1394 commands) to a central processing unit (CPU) within main logic block 410 (see FIG. 5) through IF 415 and extension bus 420. Audio and video data is transferred from these digital-input peripheral devices to main logic block 410 through an IEEE 1394 serial bus 425. From the CPU, all IEEE 1394 commands are transferred to IF 415 via extension bus 420.

Referring still to FIG. 4, extension bus 420 supports input/output (I/O) communications by providing a communication path between electronic circuitry of the main logic block 410 and a number I/O related devices. These devices include a transceiver device 430 (e.g., a modem), a remote command unit interface (RCU-IF) 435, a transmitter controller 440 and an external non-volatile memory element 445 (e.g., read only memory "ROM", flash memory, etc.). The RCU-IF 435 receives commands from the remote control (not shown), and decodes the commands to produce interrupt request signals (IRQs) corresponding to these commands. Each IRQ is transferred to the CPU within the main logic block 410. The remote control may include one described in U.S. Pat. No. 5,453,758 assigned to Sony Corporation of Tokyo, Japan, as well as any other types of remote control. The transmitter controller 440 provides a communication mechanism so that IRD 310 is able to communicate with an analog VCR via a remote transmitter. Examples of the remote transmitter may include, but are not limited or restricted to infrared transmitters such as those manufactured and commercially available from Matsushita of Osaka, Japan (referred to as a "VCR mouse"). The external non-volatile (NV) memory element 445 is connected to extension bus 420 to contain software that controls the behavior of the user interface displays based on commands from the remote control as described above and in reference to FIGS. 5 and 6.

Figure 5:
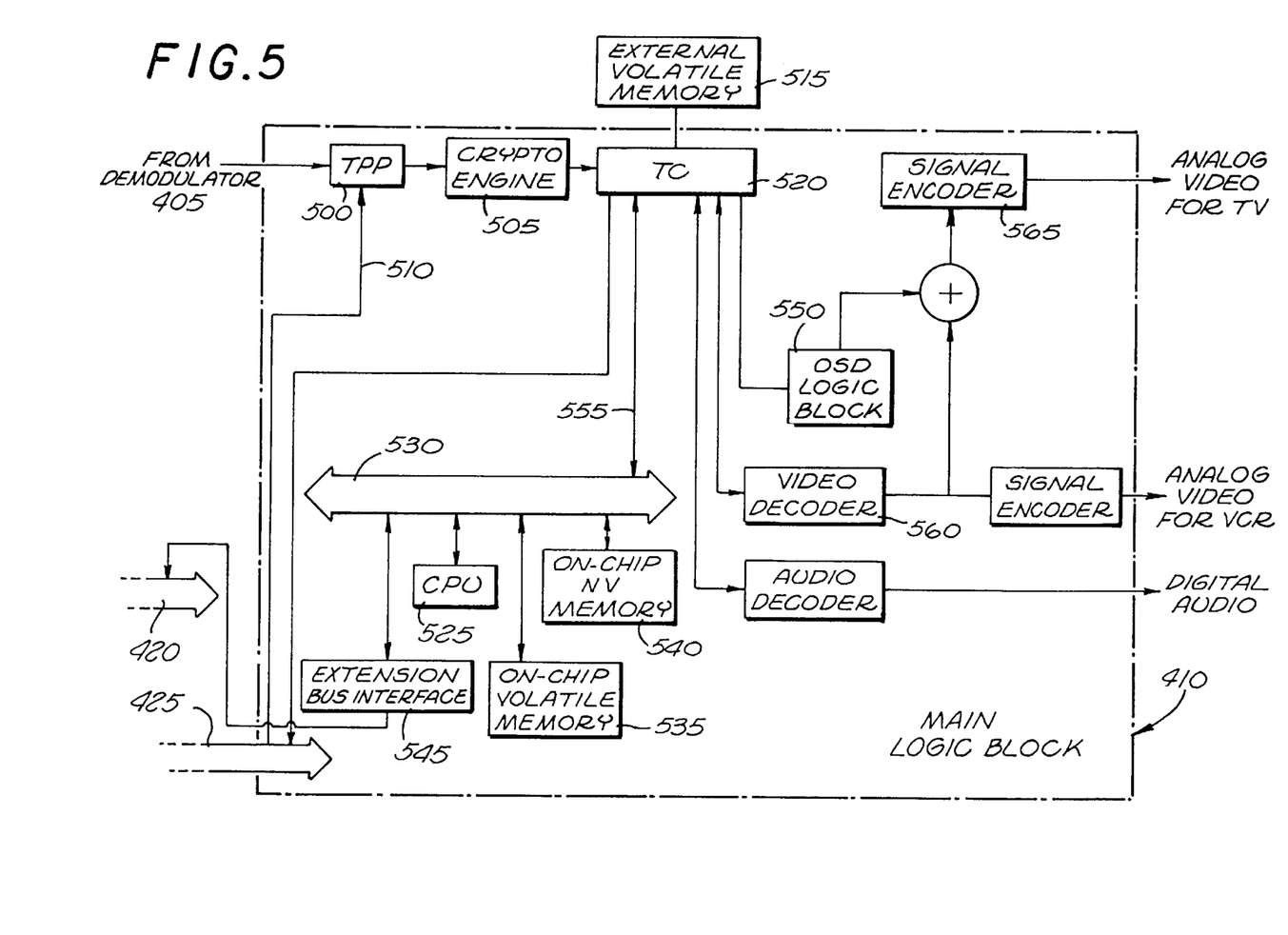
FIG. 5 is a more detailed block diagram illustrating one embodiment of a main logic block of the integrated receiver decoder of FIG. 4.

Referring now to FIG. 5, electronic circuitry of the main logic block 410 is shown. The Transport Packet Parser (TPP) 500 receives the decoded bit stream and parses the bit stream to separate information having different characteristics (video, audio, and control information). This parsed bit stream is decrypted by a cryptographic engine 505 which may operate in accordance with a cryptographic function, for example Data Encryption Standard (DES). However, if the bit stream is received from IF 415 via communication line 510, cryptographic engine 505 will be precluded from decrypting the bit stream since it is already in a decrypted form. Thereafter, the decrypted bit stream, including the programming data, is stored in an external volatile memory 515 (e.g., random access memory "RAM") under the control of traffic controller 520.

CPU 525 controls the operations of the IRD by communicating with a plurality of elements through an internal high-speed bus 530. These elements include an optional on-chip volatile memory 535, at least one on-chip non-volatile (NV) memory element 540 (e.g., read only memory "ROM", erasable programmable read only memory "EPROM", electrically erasable programmable read only memory "EEPROM" and/or other flash memory) to contain software programs, extension bus interface 545, and traffic controller 520. The on-chip NV memory 540, in lieu of external NV memory 445 of FIG. 4, may be used to store interrupt software programs and other programs needed by the CPU 525. The extension bus interface 545 allows CPU 525 to communicate with the devices coupled to extension bus 420.

Referring to FIGS. 4–5, the operations performed by the IRD to support automatic loading of programming data associated with a desired show to be recorded are described. Upon the RCU-IF 435 receiving the first command from the remote control (e.g., user depressing "guide" button of remote control), it transfers a first interrupt request signals (IRQ1), corresponding to the first command, directly to CPU 525 or indirectly through a queuing mechanism (not shown). In response to detecting IRQ1, CPU 525 executes interrupt software contained in external NV memory element 445 (or on-chip NV memory 540) and services IRQ1.

More specifically, in order to service IRQ1, CPU 525 loads a particular routine coded to control an on-screen display (OSD) logic block 550 to produce the electronic guide screen. The first operation involves the CPU 525 signaling traffic controller 520, via communication line 555, to retrieve at least programming data contained in external volatile memory 515 and route the programming data to the OSD logic block 550. Next, CPU 525 controls OSD logic block 550 to decompress the programming data in accordance with a recognized video format and to produce (for display) the electronic guide screen in a manner well-known in the art. In general, the programming data is processed as a bitmap to overlay appropriate grids forming the layout of the electronic guide screen.

The electronic guide screen may be superimposed over video by mixing the electronic guide screen with video output from video decoder 560. The video output is video received by the main logic block 410 and decompressed in accordance with Moving Picture Experts Group (MPEG), Joint Picture Experts Group (JPEG) or any other video decompression function. Alternatively, the electronic guide screen may be superimposed over a still background. In any event, the resulting mixed video output is transferred to signal encoder 565. Signal encoder 565 converts the mixed video output into an analog signal having a recognized video format such as NTSC, PAL, SECAM and the like.

As the user adjusts the position of the cursor along grids of the electronic guide screen associated with current-broadcast shows, the CPU 525 causes the front-end unit to tune to receive and display video of the show as background. Upon RCU-IF 435 receiving the second command from the remote control (e.g., user depressing "select" button of the remote control) while the cursor is positioned over a grid of a current-broadcast show, RCU-IF 435 transfers a second interrupt request signals (IRQ2). In response to detecting IRQ2, CPU 525 executes interrupt software and services IRQ2 by signaling the front-end unit 400 to tune to the broadcast channel of the current-broadcast show and to discontinue producing the electronic guide screen.

In the event that the cursor is positioned on a grid of a future-broadcast show, a still background is provided. Upon RCU-IF 435 receiving the second command from the remote while the cursor is positioned over the grid of a future-broadcast show, RCU-IF 435 transfers a third interrupt request signals (IRQ3). In response to detecting IRQ3, CPU 525 executes interrupt software and services IRQ3 by signaling OSD logic block 550 to further superimpose a screen menu 600 over the electronic guide screen as shown in FIG. 6.

Referring now to FIG. 6, the screen menu 600 includes a header 605 and a plurality of option grids $610_{1-5}$. For example, as shown, the header grid 605 indicates that the user has selected a future-broadcast show. A first, second or third option grids $610_1$–$610_3$, if selected, automatically load programming data associated with the desired show and recording interval information. The recording interval of option grids $610_1$–$610_3$ include weekly, daily or one-time programming, respectively. The fourth option grid $610_4$, if selected, allows the user to tune to the channel which will be broadcasting this show. The fifth option grid $610_5$, if selected, allows the user to exit the screen menu and return to the electronic guide screen. The interrupt software used to produced the screen menu 600 also restricts cursor movement to scrolling of the option grids $610_1$–$610_5$.

Referring to FIGS. 4–6, upon RCU-IF 435 receiving the third command from the remote while the cursor is positioned to select either the first, second, or third option grid $610_1$–$610_3$, RCU-IF 435 transfers a fourth interrupt request signal (IRQ4). In response to detecting IRQ4, CPU 525 executes interrupt software contained in external NV memory element 445 and services IRQ4. Servicing IRQ4 involves retrieving programming data associated with the future-broadcast show from external volatile memory 515 and automatically loading this programming, including show-title data and recording interval data, as record data into non-volatile memory 445. Thus, due to automatic loading of the programming data, no user input of identical information is necessary.

In the event that the programming time of the future-broadcasted show overlaps a show already scheduled to be recorded, the IRD generates a warning menu over the electronic guide screen. The warning menu indicates that the selected future-broadcast show conflicts with another show. This avoids the user from unknowingly selecting to program two shows with overlapping broadcast times.

The present invention described herein may be designed in many different embodiments and using many different configurations. As discussed herein, the architecture of the IRD is flexible, provided it includes software used to generate the screen menu when a future-broadcast show is selected. While the present invention has been described in terms of various embodiments, other embodiments may come to mind to those skilled in the art without departing from the spirit and scope of the present invention. The invention should, therefore, be measured in terms of the claims which follow.

What is claimed is:

1. A method for loading programming data of a show to be recorded by a home entertainment system, the method comprising:

responding to a first command, the first command causing a displaying of an electronic guide screen, the electronic guide screen at least identifying a future-broadcast show and a currently broadcast show, the electronic guide screen for displaying a plurality of show grids associated with a corresponding plurality of broadcast channels, one of the plurality of show grids being a show grid corresponding to the show;

responding to a second command, the second command producing a screen menu when a cursor selects the future-broadcast show, the screen menu superimposing for display over the electronic guide screen, the screen menu having a plurality of option grids; and responding to a third command operating on the screen menu, the third command causing a selection of an option grid of the screen menu, the selection of the option grid causing one of an automatic loading of programming data of the future-broadcast show into a timer memory of the entertainment system to be recorded, a tuning to the future-broadcast show, and a returning to the electronic guide screen.

2. The method of claim 1, wherein the programming data includes a digital bit stream, the digital bit stream including the programming data and sensory data corresponding to the programming data.

3. The method of claim 2, wherein the sensory data includes at least one of (i) video, (ii) audio, (iii) video and audio, and (iv) communication data.

4. The method of claim 1, wherein the programming data of the future-broadcast show comprises show-title data and recording interval data.

5. The method of claim 1, wherein the automatic loading is one of a one-time loading, a daily loading, and a weekly loading.

6. The method of claim 1, wherein the second command tunes to a broadcast channel when the cursor selects the currently broadcast show.

7. The method of claim 1, wherein returning to the electronic guide screen includes ceasing to display the screen menu.

8. A method for automatically loading programming data of a show to be recorded by an analog recording device of a home entertainment system including an antenna, a receiver device and an analog-input peripheral device, the method comprising:

responding to a first command, the first command causing a displaying of an electronic guide screen, the electronic guide screen at least identifying a future-broadcast show and a currently broadcast show, the electronic guide screen displaying a plurality of show grids associated with a corresponding plurality of broadcast channels, one of the plurality of show grids being a show grid corresponding to the show;

responding to a second command, the second command producing a screen menu when a cursor selects the future-broadcast show, the screen menu superimposing for display over the electronic guide screen, the screen menu having a plurality of option grids; and responding to a third command operating on the screen menu, the third command causing a selection of an option grid of the screen menu, the selection of the option grid causing one of an automatic loading of programming data of the future-broadcast show into a timer memory of the entertainment system to be recorded, a tuning to the future-broadcast show, and a returning to the electronic guide screen.

9. The method of claim 8, wherein producing the screen menu includes routing a control signal to a central processing unit of the receiver device;

executing software by the central processing unit to control circuitry within the receiver device; and displaying the screen menu on an analog-input peripheral device.

10. The method of claim 9, wherein the second command causes tuning to a channel when the cursor selects the currently broadcast show.

11. The method of claim 8, wherein the automatic loading of the programming data in response to the third command includes;

routing a control signal to the central processing unit; and executing software by the central processing unit to control circuitry within the receiver device to transfer the programming data into the timer memory.

12. A home entertainment system comprising:

a display monitor; and an electronic device coupled to the display monitor, the electronic device including a front-end unit to receive programming data identifying a show scheduled to be provided over a broadcast channel at a later time, a plurality of memory elements including a first memory element to store the programming data and a second memory element, physically separate from the first memory element, to contain data associated with shows to be time recorded by the electronic device, and a central processing unit coupled to the plurality of memory elements and in communication with the front-end unit, the central processing unit executing software to (i) respond to a first command, the first command causing a displaying of an electronic guide screen, the electronic guide screen at least identifying a future-broadcast show and a currently broadcast show, the electronic guide screen displaying a plurality of show grids associated with a corresponding plurality of broadcast channels, one of the plurality of show grids being a show grid corresponding to the show; (ii) respond to a second command, the second command producing a screen menu when a cursor selects the future-broadcast show, the screen menu superimposing for display over the electronic guide screen, the screen menu having a plurality of option grids; and (iii) respond to a third command operating on the screen menu, the third command causing a selection of an option grid of the screen menu, the selection of the option grid causing one of an automatic loading of programming data of the future-broadcast show into a timer memory of the entertainment system to be recorded, a tuning to the future-broadcast show, and a returning to the electronic guide screen.

13. The home entertainment system of claim 12, wherein the central processing unit of the electronic device executes software to transfer the programming data from the first memory element to the second memory element upon selection of a predetermined option grid of the screen menu.

14. The home entertainment system of claim 12, wherein the display monitor includes a television receiver.

15. The home entertainment system of claim 12, wherein the electronic device includes an integrated receiver decoder.

16. The home entertainment system of claim 12, wherein the electronic device includes a Web terminal.

17. The home entertainment system of claim 13, wherein the electronic device includes a remote control unit interface coupled to the central processing unit.

18. The home entertainment system of claim 17, wherein the remote control unit translates the command from a remote control into control signals recognized by the central processing unit to generate the screen menu and to assist loading of the programming data from the first memory element to the second memory element.

19. The method of claim 1, wherein the programming data includes a title of the future broadcast show, a start-time of the future-broadcast show, an end-time of the future-broadcast show, a date of broadcast of the future-broadcast show and a broadcast channel number.

20. The method of claim 8, wherein the programming data includes a title of the future-broadcast show, a start-time of the future-broadcast show, an end-time of the future-broadcast show, a date of broadcast of the future-broadcast show and a broadcast channel number.

* * * * *